Nov. 8, 1966 R. A. McILROY ETAL 3,284,435
GAS ABSORPTION APPARATUS
Original Filed Aug. 13, 1962
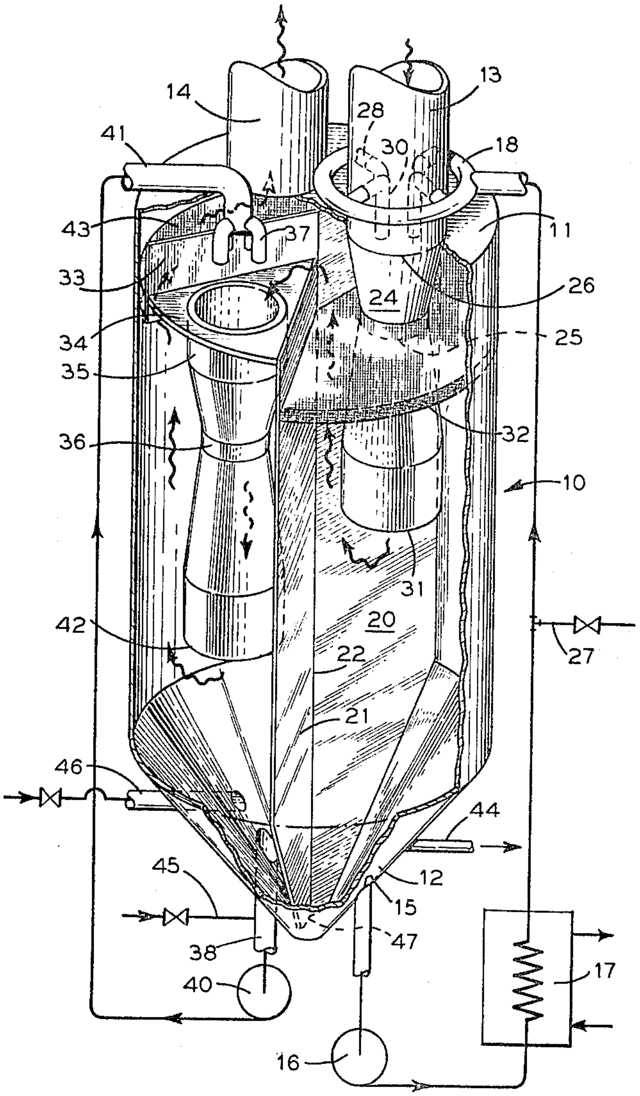
INVENTORS
Robert A. McIlroy
Henry P. Markant
BY
ATTORNEY United States Patent Office 3,284,435

Patented Nov. 8, 1966

1

2

3,284,435

GAS ABSORPTION APPARATUS

Robert A. McIlroy and Henry P. Markant, both of Alliance, Ohio, assignors to The Babcock & Wilcox Company, New York, N.Y., a corporation of New Jersey Continuation of application Ser. No. 216,432, Aug. 13, 1962. This application Nov. 19, 1965, Ser. No. 514,745
6 Claims. (Cl. 261—151)

This application is a continuation of our application filed August 13, 1962, Serial No. 216,432 and now abandoned.

The present invention relates to fluent contact apparatus, and more particularly to a compact series arrangement of apparatus for sequential stages of intimate contact between a gaseous and liquid medium, each contact stage being followed by separation of the mediums.

Gas and liquid contact apparatus is necessary in many processes where heat and/or chemical exchange between gases and liquids is desired. In such service the efficiency of the heat and/or chemical exchange between the gas and the liquid, either of which may contain solids, is largely dependent upon the intimacy of contact therebetween. A venturi-shaped gas accelerator, or duct having a constricted throat, with the liquid sprayed into the gas stream upstream of the throat is particularly effective in attaining such intimate contact. Frequently it is desirable to use a plurality of serially arranged venturi-shaped elements, each followed by gas and liquid separation, for effective contact conditions. When this is done it is necessary to provide interconnecting pipes and ducts to properly direct the gas and liquid flows to and from the contact and separation stages. Heretofore the arrangements in use have occupied a large amount of area and have been expensive to install and operate.

In the present invention a plurality of gas and liquid contact elements formed of venturi-shaped or venturi-like sections or ducts having a constriction therein are mounted for series flow of gas therethrough with each contact element followed by provision for gas and liquid separation. The several serially arranged contact and separation elements are advantageously mounted in a closed vessel with the gas flow passage between the various elements also contained within the vessel. The containing vessel will then be provided with a single inlet and a single outlet for gas flow, and suitable piping connections for liquid delivery to and discharge from the vessel. The containing vessel may be constructed to any desirable configuration and size however it is of particularly advantage to construct the vessel of a size suitable for rail shipment and preferably of circular cross-section. The clearances for railroad shipment limit the overall dimensions of the vessel, but it is possible and sometimes desirable to install multiple containing vessels as separate units arranged for parallel gas flow so as to provide the necessary gas flow capacity.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

The single figure is an isometric drawing, partly in section, of a gas and liquid contact apparatus constructed in accordance with the invention.

In the illustrated embodiment of the invention, the contact apparatus is constructed for absorption of the sulphur dioxide contained in a gas stream by a liquid solvent containing magnesium hydroxide. It will be understood that either the gas or the liquid may contain solids suspended therein, and that any acid gas may be contacted by an alkali liquid for absorptive or other purposes in the arrangement of the invention. The apparatus shown includes two venturi-shaped elements for the absorption of the $SO_2$, although it will be understood that more than two such contact elements may be arranged in series within the same vessel for $SO_2$ absorption purposes as for example, when the $SO_2$ content of the entering gas is higher than in the usual gaseous products of fuel combustion.

It will also be understood the apparatus can be used for heat exchange purposes, between, for example, a hot gas and a liquid which is concentrated by the intimate contact therebetween. In such heat exchange service two or more of the venturi-shaped elements may be used. The apparatus can also be used for other chemical or combined chemical absorption and heat transfer purposes involving gas and liquid contact.

As shown in the drawing an upright cylindrical vessel 10 is provided with a closed top formed by a substantially flat plate 11, and an inverted frusto-conical bottom member 12. In the embodiment of the invention, the vessel 10 is supported in an upright position with its longitudinal axis vertically oriented and provided with a gas inlet duct 13, and a gas outlet duct 14, each extending through the top plate 11.

The inverted frusto-conical bottom 12 of the vessel is provided with a liquid outlet 15 positioned intermediate the height of the bottom 12 for removal of liquid from the vessel, from whence it is recirculated by a pump 16 through an external heat exchanger 17 to a liquid distributing manifold 18 surrounding the gas inlet pipe 13 above the top plate 11 of the vessel.

Within the vessel are provided a pair of angularly spaced, radially extending partitions 20 and 21, which are connected with the external wall 10 of the vessel and are joined along the upright longitudinal axis 22 of the vessel to form the first section of the vessel. The lower end of partitions 20 and 21 terminate at a position spaced below the liquid outlet 15 in the inverted frusto-conical bottom 12 to form a submerged or inverted weir 47. As shown, the included angle between the two partitions 20 and 21 is of the order of 160°.

Within the sector defined by the partition walls 20 and 21 and the included 160° arc of the external wall 10 of the vessel is positioned an upright venturi-shaped element 24 which extends downwardly from the top plate 11 into the vessel. The upper end of the element 24 is attached to and merges into the gas inlet duct 13 for downward passage of incoming gases. The throat 25 of the element is spaced beneath the top plate 11 so that the contracting portion of the venturi-shaped element has its base 26 positioned substantially at the elevation of the top cover plate 11.

The manifold 18 receiving the recirculated liquid from the pump 16 and the heat exchanger 17 is also supplied with make-up magnesium hydroxide slurry through a valved pipe 27, with the mixture of liquids passing from the manifold 18 into the gas entering the element 24 through 4 equiangularly spaced pipes 28. Each of the pipes 28 extends radially into the gas inlet duct 13 and is provided with a 90° elbow and a downward extension 30 for the concurrent injection of sprayed liquid into the gases entering the contact element 24. In the construction described the incoming gases are accelerated on entering the venturi-like element and during their acceleration are contacted by the liquid sprays which are introduced substantially at the base 26 of the contact element 24 and in a direction parallel to the incoming gas stream for mixing in the throat 25. Leaving the throat 25 of the element the gases with entrained liquid droplets therein discharge downwardly into the open space below the lower end 31 of the element 24.

The discharged mixture of liquid and gas turns through an angle of 180° to pass upwardly through a sector shaped gas and liquid separating pad 32 which is located generally at the elevation of the throat 25 of the venturi-like element 24 and extends throughout the cross-sectional area surrounding the throat 25 of the first section of the vessel. Partial separation of the gas and liquid mixture is accomplished in turning for upward flow in the space below the end 31, with the liquid moving by gravity effect toward the bottor 12 of the vessel. A major portion of the remaining liquid droplets entrained in the gases are removed therefrom in passing through the separator pad 32 and fall to a pool of liquid in the bottom of the vessel.

As hereinafter described the separating device or pad 32 is formed of a compacted mass of, for example, stainless steel wool. The optimum design velocity through the separating device is generally in the order of 12 ft./sec. and is dependent on the density and free flow area of the pad along with the properties of the fluid to be separated. The pressure drop of the gas flowing through the pad in addition to the above is affected by the thickness of the pad which may vary from 4–12 inches. The pressure drop through the pad is generally low but can be as high as 2″ water gage. While the separation of liquid droplets from the entraining gas is not complete under such low pressure drop conditions, a major portion of the entrained liquids are retained in the first section of the contact device.

The upper extended portion 33 of the partition 21 above the pad 32 is displaced clockwise at an angle of the order of 30° with respect to partition 21 and is connected with the partition 21 by a horizontally disposed seal plate 34. The plate 34 is provided with an opening in which the upper cylindrical end 35 of a venturi-like element is supported with its throat 36 positioned at a lower elevation than the throat 25 of element 24. Thus, the gases leaving the pad 32 pass in a horizontal direction over the seal plate 34, and through the upper end 35 of the second venturi-like contact section, for downward movement therethrough. The second venturi-like element extends downwardly in the vessel to a level below that of the first element and is provided with a liquid spray from four equi-angularly spaced downwardly directed nozzles 37. Liquid is removed from the lower portion 12 of the vessel through a pipe 38 by a pump 40 and is delivered to the spray nozzles 37 through a pipe 41.

As hereinbefore described, the gases entering the second venturi-like element entrain liquid particles projected into the gas stream from the spray nozzles 37. The droplets of liquid injected into the gas stream are further atomized by the acceleration of the gases as they pass through the throat 36, for intimate contact therebetween. The mixture of gases and entrained droplets discharge from the lower end 42 of the contact element and turn for upward movement toward the gas outlet 14. The partitions 20 and 21 force all of the gases leaving the end 42 of the second contact element to pass upwardly through a liquid and gas separator or horizontally disposed pad 43 positioned between the partition 20 and partition portion 33. This gas and liquid separating pad 43 is of greater density and depth than pad 32, and provides a greater cross-sectional flow area than pad 32 for removal of a major portion of the liquid from the gas. The pressure drop through this separator may be greater than 2.0″ water gage and has a high separation efficiency so that little or no liquids or solids remain entrained in the gases discharging through the outlet 14.

A portion of the liquid in the bottom 12 under the second venturi-like element will mix with that liquid in the liquid portion under the first venturi-like element by flow through the under flow weir 47. The rate of liquid flow through the under flow weir 47 is controlled by the rate at which product liquid is withdrawn through pipe 44 and is such that the proper levels are maintained in the two portions of the bottom 12.

It is usually desirable to separately add magnesium hydroxide slurry to the liquid recirculated through the pump 40 and delivered to the spray nozzles 37. Such additions of slurry are introduced through a valved pipe 45 and are desirable to control the pH value of the sprayed liquid for most efficient $SO_2$ absorption. As shown in the drawing, the pipe 38 leading from the inverted frusto-conical bottom of the vessel to the pump 40 has its inlet opening above the lower ends of the partitions 20 and 21. The liquid thus withdrawn will be of a generally lower concentration than that available through the product discharge pipe 44, or recirculated through the pump 16 to the spray nozzles 30. In addition it is desirable to add sufficient make-up water to the inverted frusto-conical bottom of the vessel to maintain the level of liquid therein, as may be done through a valved pipe 46.

In the operation of the apparatus described, for example in the absorption of $SO_2$ in a magnesium hydroxide slurry, a flue gas resulting from the combustion of residual liquor and containing sulphur dioxide is delivered through the duct 13 to the first contact element. The gas may be at a temperature of 250° F. and the $SO_2$ content may be of the order of 1% by weight. In passing through the gas and liquid contact element 24 the sprayed liquid cools the gases to a temperature of the order of 104° F. and due to the intimate contact therebetween absorbs a major portion of the $SO_2$ contained in the gas. The heat exchanger 17 controls the gas temperature by cooling the liquid delivered to the pipes 30 and sprayed into the venturi-like element 24 so that the liquid may cool the gas in the contact apparatus.

The liquid collected in the bottom 12 or sump of the vessel from both of the venturi-like elements will mingle due to the flow connection formed beneath the lower ends of the partitions 20 and 21. However, the liquid withdrawn through the product discharge line 44 will be a strong acid since the outlet from the vessel is located above the submerged weir 47 formed by the lower edges of the partitions 20 and 21. The recirculated liquid supplied to the spray nozzles 37 will be a relatively weak acid or even alkaline since the inlet connection to the pump 40 from the sump will be above the submerged weir 47 formed by the lower end of the partitions 20 and 21. The pH of the liquid supplied to the spray nozzles 30 and 37 can be regulated by the controlled admission of the magnesium hydroxide acid through the pipes 27 and 45, respectively.

While the liquid and solids entrained in the gases leaving the separating pad 32 may amount to 1% by weight of the gases delivered to the throat 34, the pad 43 will substantially completely remove the liquids and solids from the gases prior to their entering the outlet duct 14. This is due to the higher removal efficiency of the pad 43 with its greater cross-sectional flow area and higher density.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. Gas and liquid contact apparatus having an upright vessel of generally circular horizontal cross-section, a plurality of radially extending vertical baffle plates arranged to divide the entire cross-sectional area of said vessel into a plurality of parallel substantially separate gas chambers of sectoral horizontal cross-section, said vessel having a closed bottom forming a liquid collecting space, said baffle plates having their lower ends terminating below the normal liquid level in said liquid collecting space, means providing a flow of liquid in said liquid collecting space between said chambers, means providing a gas flow sequentially through said chambers comprising a gas inlet to said vessel at the top of a first of said chambers, a gas outlet from said vessel at the top of the chamber farthest downstream in a gas flow sense from said gas inlet, means providing a gas flow passage between the upper ends of at least two of said chambers, vertically arranged Venturi-shaped gas ducts in at least two of said chambers having their lower ends terminating above the normal liquid level in said chambers and arranged to receive gas for a downward flow sequentially therethrough, a spray nozzle arranged to discharge a downwardly directed spray of liquid into each of said Venturi-shaped gas ducts in intimate contact with the gas flowing downwardly through said gas ducts, means for withdrawing liquid from the portion of said liquid collecting space below the first chamber, and means for supplying make-up liquid to the portion of said liquid collecting space below a chamber downstream in a gas flow sense of said first chamber.

2. Gas and liquid contact apparatus according to claim 1, wherein means are provided to recirculate liquid from the liquid collecting space of said first chamber to the spray nozzle of the venturi-shaped duct in the same chamber.

3. Gas and liquid contact apparatus according to claim

2, wherein means are provided to add a modifying liquid to the recirculated liquid delivered to said spray nozzle to control the composition of the liquid contacting said gas.

4. Gas and liquid contact apparatus according to claim 2, wherein heat exchange means are provided to regulate the temperature of the liquid delivered to said spray nozzle.

5. Gas and liquid contact apparatus according to claim 1, wherein separate means are provided to recirculate liquid from the liquid collecting space of each chamber to the nozzle of the venturi-shaped duct in the corresponding chamber.

6. Gas and liquid contact apparatus according to claim 5, wherein means are provided to add a modifying liquid to the recirculated liquid.

References Cited by the Examiner

UNITED STATES PATENTS

| | | | |
|---|---|---|---|
| 934,205 | 9/1909 | Nix | 261—116 |
| 1,979,189 | 10/1934 | Bowers | 55—238 XR |
| 2,032,404 | 3/1936 | Fisher | 216—116 |
| 2,050,797 | 8/1936 | Kerschbaum et al. | 55—229 XR |
| 2,484,277 | 10/1949 | Fisher | 55—228 XR |
| 2,871,973 | 2/1959 | Roujob | 55—229 XR |
| 3,048,956 | 8/1962 | Lundy et al. | 55—258 XR |
| 3,142,548 | 7/1964 | Krantz | 55—89 |

ROBERT F. BURNETT, *Primary Examiner.*

RONALD R. WEAVER, *Examiner.*